United States Patent Office 3,211,759
Patented Oct. 12, 1965

3,211,759
18-20-CYCLO STEROIDS
Oskar Jeger, Zurich, Switzerland, assignor to Ciba Corporation, New York, N.Y., a corporation of Delaware
No Drawing. Filed July 23, 1962, Ser. No. 211,875
Claims priority, application Switzerland, June 18, 1958, 60,714/58; Jan. 12, 1959, 68,202/59; Sept. 30, 1959, 78,827/59
17 Claims. (Cl. 260—397.3)

This is a continuation-in-part application of my application Serial No. 711, filed January 6, 1960, now abandoned, which in turn is a continuation-in-part application of my applications Serial No. 820,595, filed June 16, 1959, now abandoned, and Serial No. 820,599, now U.S. Patent 3,104,029, filed June 16, 1959.

The present invention is based on the observation that new 18:20-cyclo-steroids are obtained by irradiating 20-oxo-steroids. The present process is represented by the following formula scheme:

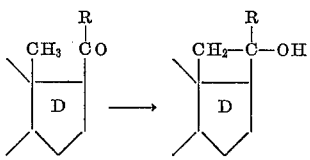

in which R stands for hydrogen or a lower aliphatic hydrocarbon radical, such as a lower alkyl, more especially a methyl group.

The 18:20-cyclo-steroids obtained by the present process display a biological action. Furthermore, they are suitable as intermediates for the manufacture of 18-oxygenated steroids, as will be realized from the following scheme of partial formulae:

Since the discovery of aldosterone, 18-oxygenated steroids have gained considerable importance. Many are of physiological interest, having properties resembling those of aldosterone and other corticoids; others may be used as intermediates for the manufacture of the latter. Of the 18:20-cyclo-steroids there are especially mentioned compounds of the Formula I (I) 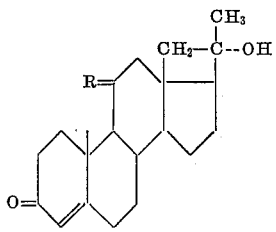

in which R represents a free or esterified hydroxyl group in α- or β-position together with a hydrogen atom, or an oxo group. Inter alia, such compounds can be used as protectives against an endotoxin shock and, in addition, they display a local anaestetic action.

The irradiation according to the invention is advantageously carried out in an organic solvent such as a hydrocarbon, for example pentane, hexane, cyclohexane and the like, an alcohol such as methanol, ethanol, propanol, butanol and the like, an ether such as diethyl ether, dioxane and the like, or a carboxylic acid such as a lower alkanoic acid, e.g., acetic, propionic butyric acid and the like, in the presence or absence of water. When the irradiation is performed in the presence of sulfuric acid, e.g., in a mixture of acetic acid and sulfuric acid, dehydration on the carbon atom 20 may occur simultaneously with the ring closure, $\Delta^{18,20}$-compounds of the aforementioned kind being formed. Suitable sources of light are

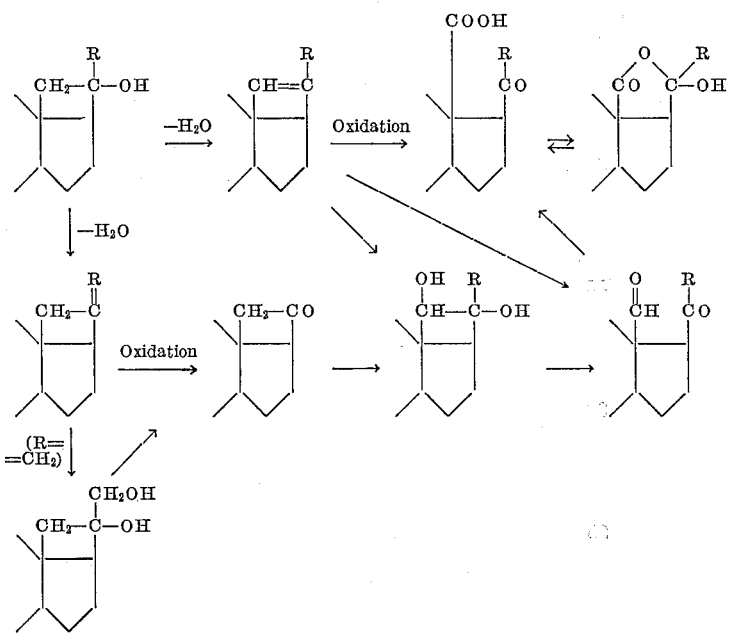

and as is described in more detail in U.S. Patent No. 3,014,029 and in the following disclosure.

artificial or strong natural light. It is of advantage to use ultraviolet light, such as is supplied by high-pressure mercury lamps, or strong sunlight. Normally the process is conducted at a temperature ranging from −10° C. to +150° C., but the reaction can likewise be conducted at a higher or lower temperature, since it has been observed that the temperature has less influence on the progress of the reaction than has the kind of solvent used and/or the duration of the irradiation treatment.

The 20-oxo-steroids of the 5α- and 5β-series, used as starting materials, are known or can be made by methods known in the art. They may contain further substituents in addition to those mentioned above, such as free or functionally converted hydroxyl or oxo groups, halogen atoms, or alkyl (such as methyl) groups, for example in positions 1, 2, 3, 4, 5, 6, 7, 8, 9, 11, 12, 14, 15, 16, 17, 19 or 21. They may be saturated in the ring system or contain double bonds, for example in one or several of the positions 4, 5, 9(11), 11, 14 or 16. By functionally converted hydroxyl or oxo groups respectively are meant esterified or etherified hydroxyl groups, or ketalized or enolized oxo groups, or oximes, hydrazones, semicarbazones and the like. Esterified hydroxyl groups mentioned above are those esterified with organic carboxylic or sulfonic acids having preferably up to 12 carbon atoms, particularly aliphatic carboxylic acids, such as alkanoic acids, e.g., acetic, propionic butyric, pivalic acid and the like, alkenoic acids, e.g., undecylenic acid and the like, cycloalkane carboxylic acids, e.g., cyclohexane carboxylic acid and the like, cycloalkyl-alkanoic acids, e.g., β-cyclopentyl-propionic acid and the like or isocyclic or heterocyclic, especially monocyclic, aromatic carboxylic or sulfonic acids, e.g., benzoic, nicotinic, isonicotinic, p-toluene sulfonic acid and the like. Etherified hydroxyl groups are those etherified, for example, with aliphatic alcohols, such as lower alkanols, e.g., methanol, ethanol and the like, or heterocyclic alcohols, e.g., 2-tetrahydropyranol and the like. Ketals are particularly those with aliphatic diols, such as lower alkene diols, e.g., ethylene or propylene glycol and the like. Specific starting materials are, for example, progesterone, 11α- and 11β-hydroxy-progesterone, 11-keto-progesterone, cortexone, 17α-hydroxy-cortexone, corticosterone, cortisone, hydrocortisone, 11-epi-hydrocortisone and substitution products thereof containing in position 9α or 12α a fluorine or chlorine atom and/or in position 16α a hydroxyl group, as well as appropriate 3-ketals and compounds saturated in ring A.

A product of the present process that contains free hydroxyl and/or oxo groups can be converted in the known manner into a functional derivative thereof, such as an ester, ether, enol ester, enol ether, acetal, a corresponding thio derivative (such as thio-ether, thio-acetal or ester of a thio-acid), or into a hydrazone or oxime thereof. The acid radicals in the esters and enol esters are those of the above mentioned acids, such as of saturated or unsaturated aliphatic, cyclo-aliphatic, aromatic or heterocyclic monocarboxylic or dicarboxylic acids, preferably those having from 2 to 8 carbon atoms or of organic sulfonic acids, or of phosphoric, sulfuric or hydrohalic acids. The radicals in the ethers, enol ethers, acetals or in the corresponding thio-derivatives may belong to the aliphatic, aromatic or heterocyclic series; such radicals are, for example, lower alkyl or alkylene groups such as methyl, ethyl, propyl, ethylene, propylene groups and the like, or lower aralkyl groups, such as benzyl, diphenyl-methyl, triphenylmethyl groups and the like, further tetrahydropyranyl groups or sugar radicals such as those of glucose, galactose or maltose and the like. Functional groups, particularly oxygen functions, e.g., hydroxyl groups and the like, as well as double bonds may be introduced subsequently according to known methods. For example, compounds of the Formula I can be obtained when a compound of the Formula II

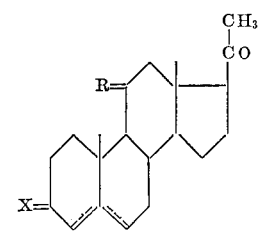

(II)

in which R has the meaning given for Formula I and X represents a free or functionally converted hydroxyl group together with a hydrogen atom, or a free or functionally converted oxo group and in which there may also be present a double bond starting from carbon atoms 5—is irradiated in a solvent with ultraviolet light, for example, according to the method described above and, if the starting materials used contained no Δ$^4$-3-oxo group, this group is formed in the resulting cyclisation products by a known method and, if desired, an 11-hydroxyl group is dehydrogenated to an 11-oxo group and/or free hydroxyl groups are esterified or esterified hydroxyl groups are liberated. A functionally converted hydroxyl group is, for example, an etherified or esterified hydroxyl group; a functionally converted oxo group is, for example, a hydrazone, semicarbazone, enolamine or more especially a ketal group. According to another method a compound of the Formula III

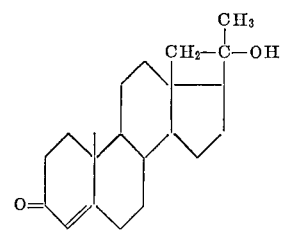

(III)

is used as starting material and the 11-hydroxyl group is introduced enzymatically; if desired, the 11-hydroxyl group in an 11-hydroxy compound obtained in this manner is dehydrogenated to the oxo group and/or the reactions referred to above are used for converting a free hydroxyl group into an esterified hydroxyl group or vice versa.

The conversion of a free or functionally converted hydroxyl group in position 3 into an oxo group, and the introduction of a double bond in position 4:5 of saturated compounds is performed in known manner. Thus, for example, a free 3-hydroxyl group is dehydrogenated to the oxo group with chromic acid in an acidic solution or with chromium trioxide-pyridine, and this operation is normally accompanied by dehydrogenation of an 11-hydroxyl group to the oxo group. It is also possible to achieve selective dehydrogenation in position 3 by starting from a compound which contains, for example, a double bond in position 4:5, and oxidising it by the Oppenauer method. Finally, in a 3:11-dihydroxy compound, in which both hydroxyl groups are esterified, the 3-hydroxyl group can be selectively liberated and then dehydrogenated to the 3-oxo group. A double bond can be introduced in position 4:5, for example by brominating the saturated compound of the allo-series, treating the resulting 2:4-dibromo compound with sodium iodide in acetone solution and removing the iodine from the resulting 2-iodo-$\Delta^4$ compound under reducing conditions. From 3-ketals the new, valuable compounds can be prepared by the conventional acid scission with a dilute acid, for example acetic or perchloric acid. Esterified hydroxyl groups are saponified by alkaline hydrolysis, for example, with sodium bicarbonate, sodium hydroxide, potassium bicarbonate or potassium hydroxide.

For the enzymatic introduction of an 11β-hydroxyl group use is made of the generally known relevant methods and means, for example hydroxylation with organenzymes, such as those of the suprarenal glands, or enzymes of microbiologically origin, for example those of the fungus genera Cunninghamella or Curvularia, more especially *Curvularia lunata* or *Cunninghamella bainieri* or *Cunninghamella elegans*.

The hydroxylation in position 11α is preferably performed with enzymes of the fungus *Aspergillus ochraceus*. It has been established that the other fungi, conventionally used for the 11α-hydroxylation of a steroid, are little suitable for the starting materials to be used in the present process. Thus, for example, the present process fails when Rhizopus nigricans or *Aspergillus niger* is used, while in the case of *Aspergillus arrhizus* the desired 11α-hydroxy compounds are obtained only in very minor yields. It is all the more unexpected that *Aspergillus ochraceus*, on the other hand, gives a very good yield of the 11α compound.

The reaction of the $\Delta^4$-3-oxo-18:20-cyclo-20-hydroxy-pregnene of the Formula III with the enzymes mentioned can be carried out by the methods known for microbiological hydroxylation. In general, the starting materials are incubated directly with cultures of the strain referred to grown under aerobic conditions. It is of advantage to agitate, that is to say shake or stir, said cultures which contain assimilable carbon, more especially carbohydrates, and possibly also growth-promoting substance, for example corn steep liquor or beer wort and inorganic salts. Accordingly, there may be used natural, synthetic or semi-synthetic nutrient solutions.

The method which has proved to be the simplest in actual practice consists in growing the organism in apparatus and under conditions similar to those applied in the manufacture of antibiotics and known as the deep-tank method. The temperature is advantageously kept at 24 to 27° C., and under these conditions the cultures are fully matured after 1 to 2 days. The starting material is then added under sterile conditions, in the form of a fine dispersion or solution, for example, in methanol, ethanol, acetone, dioxane or propylene glycol, and incubation is then continued. Finally, the mycelium is separated and, if desired, extracted, for example, with methanol or acetone, and the extract is evaporated and added to the culture filtrate. The latter is then extracted with a suitable solvent such as ethyl acetate, chloroform, ethylene chloride or methylene chloride, whereupon the extract is washed with dilute sodium bicarbonate solution and then with water, and finally evaporated. From the residue $\Delta^4$-3-oxo-11:20-dihydroxy-18:20-cyclopregnene can be isolated by distribution methods, chromatography or crystallization and then purified.

As previously mentioned the compounds resulting from the above irradiation procedure can be utilized as pharmacologically active compounds or as intermediates for the preparation of the latter. For example 18:20-cyclo-20-oxo-compounds of the 21-nor-pregnane series may be obtained in good yield when an 18:20-cyclo-20-hydroxy compound of the pregnane series is dehydrated and in the resulting $\Delta^{20}$-18:20-cyclopregnene compound the double bond in 20:21-position is oxidatively split; at any stage of the process an esterified hydroxyl group may be hydrolysed or free hydroxyl groups esterified and/or an etherified or ketalized oxo group may be hydrolysed or free oxo groups etherified or ketalized.

In the above process water is eliminated in a first reaction wtih the use of a dehydrating agent, such as thionyl chloride, phosphorus oxychloride, methanesulfonyl chloride and the like, in the presence of a basic substance, for example, pyridine, collidine and the like. Alternatively, the elimination of water may be performed by treatment with a mixture of pyridine and bromoacetamide or bromosuccinimide, followed by treatment with sulfur dioxide or by conversion into a 20-O-acyl derivative and by pyrolysis. 20-sulfonic acid ester groups, for example tosylates or mesylates, can be eliminated by treatment with a solution of lithium chloride in dimethyl formamide. It is also possible to perform the elimination of water with an acid silicate, for example, fuller's earth. The dehydrated products are $\Delta^{18:20}$-18:20-cyclopregnenes and $\Delta^{20:21}$-18:20-cyclo-pregnenes, respectively.

The cleavage of the 20:21-double bond is performed in the manner generally known for the oxidative cleavage of double bonds. The ozonides resulting from the action of ozone are split reductively, for example, with zinc and acetic acid. Alternatively, the double bond may be hydroxylated, for example, by treatment with a molecular proportion of osmium tetroxide, the resulting glycol then being split with periodic acid, lead tetraacetate or sodium bismuthate. Another way of splitting the double bond consists in performing the oxidation with an alkali metal periodate, such as sodium periodate, in the presence of a catalytic amount of osmium tetroxide with addition of an alkali metal salt of a carboxylic acid, such as potassium acetate and the like, in an aqueous medium.

As the products of the irradiation procedure the products according to the latter method may contain further substituents, such as free or functionally converted hydroxyl or oxo groups, halogen atoms, alkyl such as methyl groups, for example in the positions 1, 2, 3, 4, 5, 6, 7, 8, 9, 11, 12, 14, 15, 16, 17, 19 and 21. They may be saturated in the ring system or contain double bonds, for example in one or several of the positions 4, 5, 9(11), 11, 14 and 16. The term functionally converted hydroxyl or oxo groups designates esterified or etherified hydroxyl groups, or ketalized or enolized oxo groups, or oximes, hydrazones or semicarbazones described more extensively hereinabove.

A product of the latter procedure that contains free hydroxyl and/or oxo groups can be converted in the usual or predescribed manner into a functional derivative thereof, such as an ester, ether, enol ester, enol ether, acetal, an approriate thio derivative, for example thio ether, thio acetal or ester of a thio acid, also into a hydrazone or oxime.

The 18:20-cyclo-20-oxo compounds of the 21-nor-pregnane series obtained as the products of the above method may be used as intermediates in the manufacture of 18-hydroxy steriods which can then be converted into aldosterone or 18-oxygenated steriods which may serve as intermediates for the preparation of the hormone or analogous, physiologically active compounds; thus the lactone of an 18-hydroxy-etio acid is obtained, for example, by treatment of an 18:20-cyclo-20-oxo-compound of the 21-nor-pregnane series with a per-acid according to the following scheme:

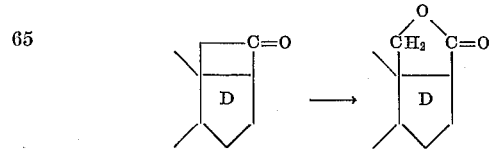

Resulting lactones can then be reacted, for example, with a Grignard reagent, such as methyl magnesium bromide and there are thus obtained 18:20-oxido-20-hydroxy-pregnane compounds, that is to say, 18-hydroxy-20-oxo-pregnane compounds.

The following examples illustrate the invention and are not to be construed as being limitations thereon. Temperatures are given in degrees centigrade.

EXAMPLE 1

500 mg. of 3β-acetoxy-20-oxo-allopregnane are dissolved in 100 cc. of hexane, and the solution is irradiated in a cylindrical quartz vessel provided with an immersion cooler at approximately 15° C. for 45 minutes with a high-pressure quartz burner, Type Biosol Philips (250 watt), the distance between burner and reaction vessel being approximately 5 to 10 cm. During the irradiation the solution is vigorously stirred with a magnetic stirrer. To work up the solution it is cautiously evaporated at room temperature to dryness in a water-jet vacuum. The residue is then dissolved in 50 cc. of a 1:1-mixture of petroleum ether+benzene, and the solution is filtered through a column of 20 grams of neutral alumina of activity II. After eluting with approximately 100 cc. of a 1:1 mixture of petroleum ether and benzene, a total of 40 mg. of substance—which displays in the infrared absorption spectrum, apart from the band of the 20-keto group at 1710 cm.$^{-1}$ (in chloroform) typical of the starting material, an absorption band of the free hydroxyl group at 3620 cm.$^{-1}$—elution with benzene and with mixture of benzene+ether yields a total of 410 mg. of a substance which is saturated towards tetranitromethane, whose infrared absorption spectrum contains only the strong band of the free hydroxyl group at 3620 cm.$^{-1}$ as well as the 3β-acetate band at 1730 cm.$^{-1}$ but no band of the 20-oxo-group. This reaction product is 3β-acetoxy-20-hydroxy-18:20-cyclo-allopregnane.

EXAMPLE 2

A solution of 500 mg. of 3β-acetoxy-20-oxo-allopregnane in 100 cc. of a 5:1 mixture of glacial acetic acid and concentrated sulfuric acid is irradiated for 45 minutes as described in Example 1. To work up the reaction mixture it is cautiously introduced into ice-cooled N-sodium hydroxide solution, then taken up in ether and worked up in the usual manner. Chromatographic purification yields 380 mg. of a colorless oil consisting of a mixture of 3β:20-diacetoxy-18:20-cyclo-allopregnane and the double bond isomeric $\Delta^{18:20}$- and $\Delta^{20:21}$-3β-acetoxy-18:20-cyclo-allopregnenes. By refluxing the mixture for 1 hour with 10 cc. of acetanhydride and 10 cc. of pyridine, a mixture of the $\Delta^{18:20}$- and $\Delta^{20:21}$-3β-acetoxy-18:20-cyclo-allopregnenes is obtained.

EXAMPLE 3

500 mg. of 3β-acetoxy-20-oxo-allopregnane are dissolved in 80 cc. of hexane. The irradiation apparatus (quartz) is thoroughly swept with nitrogen, and the solution is irradiated for 1 hour with the mercury lamp mentioned in Example 1, the cooling water being maintained at 15–18° C. This experiment is repeated 18 times.

The combined irradiation products (9.14 grams of a yellow oil) are dissolved in 60 cc. of petroleum ether+benzene (2:1) and chromatographed on 290 grams of alumina, the following fractions being obtained:

| Fractions | Solvent | Ratio | Amount in cc. | Eluate in grams |
|---|---|---|---|---|
| 1–5 | p.e.+b | 2:1 | 1,100 | 2.588 |
|  |  | 3:2 | 200 |  |
| 6–13 | b |  | 1,200 | 2.896 |
| 14 | b.+e | 50:1 | 200 | 0.292 |
| 15 | b.+e | 20:1 | 200 | 0.281 |
| 16 | b.+e | 20:1 | 150 | 0.316 |
| 17 | b.+e | 20:1 | 150 | 0.388 |
| 18 | b.+e | 20:1 | 300 | 0.684 |
| 19 | b.+e | 10:1 | 300 | 0.407 |
| 20 | e |  | 300 | 1.102 | p.e.=petroleum ether.
b.=benzene.
e.=ether.

The fractions 14–20 are recrystallized once, combined and again recrystallized from ether+petroleum ether, yielding 2.164 grams of pure 18→20-cyclo-3β-acetoxy-20-ξ-hydroxy-allopregnane melting at 139–140° C.

The irradiation product (M.P. 139–140° C.) shows with 3β-acetoxy-20-oxo-allopregnane (M.P. 146° C.) a melting point depression of about 30° C. and no consumption of chromic acid when subjected to micro-oxidation with chromic acid and glacial acetic acid according to Schreiber and Eschenmoser (Helv., 38, page 1529 [1955]). Ultraviolet spectrum: no bands. Infrared spectrum in carbon tretrachloride: 3600 cm.$^{-1}$, 3500 cm.$^{-1}$ (hydroxyl); 1727 cm.$^{-1}$, 1245 cm.$^{-1}$ (acetate). The keto band (1705 cm.$^{-1}$), which in the starting product is distinctly separate from the acetate band, has disappeared completely.

Hydrogenation experiment 18 mg. of 18→20-cyclo-3β-acetoxy-20-ξ-hydroxy-allopregnane are dissolved in 6 cc. of glacial acetic acid and stirred for 24 hours with 30 mg. of pre-hydrogenated platinum oxide under hydrogen (in a micro-hydrogenation apparatus). No hydrogen is absorbed. The resulting crystals reveal in the melting point and mixed melting point tests that they are identical with the starting material.

Hydrolysis 60 mg. of 18→20-cyclo-3β-acetoxy-20-ξ-hydroxy-allopregnane are hydrolysed for 6 hours at 30° C. with 6 cc. of methanolic potassium hydroxide solution of 5% strength. Working up yields 55 mg. of crystalline 18→20-cyclo-3β:20-ξ-dihydroxy-allopregnane which, after having been crystallized 5 times from aqueous acetone, melts at 231.5–232° C.

EXAMPLE 4

2.5 grams of $\Delta^5$-3-ethylenedioxy-20-oxo-pregnane are irradiated in 5 portions with the mercuury burner mentioned in Example 1. The crude irradiation product—infrared spectrum: 3400 cm.$^{-1}$ (hydroxyl), 1705 cm.$^{-1}$ (20-ketone), 1642 cm.$^{-1}$ (double bond)—is chromatographed over 85 grams of alumina.

| Fractions | Solvent | Ratio | Eluate in mg. | Remarks |
|---|---|---|---|---|
| 2–3 | p.e.+b | 4:1 | 479 | IR: 3,060 cm.$^{-1}$, 1,645 cm.$^{-1}$=CH$_2$, 895 cm.$^{-1}$ {Constitution not yet known} |
| 7–8 | p.e.+b | 2:1 | 214 | Unreacted starting material. |
| 12 | b |  | 163 | M.P.: 120–25°. IR: 1,710 cm.$^{-1}$ 20-ketone. 1,645 cm.$^{-1}$, 890 cm.$^{-1}$=CH$_2$ |
| 15 | b |  | 190 |  |
| 16 | b |  | 205 | Spontaneous crystallization. |
| 17 | b |  | 120 | M.P.: 219° (recrystallized from ether+hexane). |
| 18 | b |  | 80 |  |
| 19 | b.+e | 50:1 | 24 | IR: 3,420 cm.$^{-1}$ (OH), no ketone band. |
| 20 | b.+e | 50:1 | 37 |  |
| 21 | b.+e | 50:1 | 41 |  |
| 22 | b.+e | 10:1 | 55 |  |
| 23 | b.+e | 5:1 | 67 |  |
| 24 | e |  | 49 |  | p.e.=petroleum ether.
b.=benzene.
e.=ether.

The constitution of the compound from fractions 2–3 is not yet known.

Fractions 7–8 constitute unreacted starting material.

The ketone melting at 120–125° C. obtained from fraction 12, corresponds to the following formula

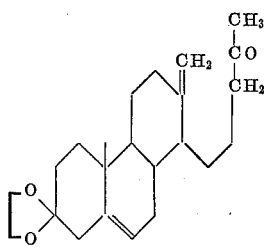

Fractions 15–24 constitute Δ⁵-3-ethylenedioxy-20-ξ-hydroxy-18:20-cyclo-pregnene melting at 219° C.; optical rotation $[\alpha]_D = -27°$ (chloroform).

EXAMPLE 5

The ketal grouping is split by treating 460 mg. of Δ⁵-3-ethylenedioxy - 20 - ξ - hydroxy-18:20-cyclo-pregnene with 50 cc. of acetic acid of 50% strength for 2 hours at 50° C. After working up, 390 mg. of a crude product are obtained which after being purified by means of chromatography, yields crystals melting at 196–197° C. from acetone-hexane. The so-obtained Δ⁴-20-ξ-hydroxy-3-keto-18:20-cyclo-pregnene exhibits in the infrared spectrum (chloroform) bands at 3650 cm.⁻¹ (hydroxyl) and 1665/1620 cm.⁻¹ (doublet of the α:β-unsaturated carbonyl).

Δ⁵ - 3 - ethylenedioxy-20-ξ-acetoxy-18:20-cyclopregnene is obtained in quantitative yield by esterifying the free alcohol with acetic anhydride-pyridine at room temperature for 100 hours. After crystallization from ether-petroleum ether the product melts at 153–156° C. Infrared spectrum (chloroform): bands at 1725 and 1250 cm.⁻¹ (acetate).

EXAMPLE 6

1 gram of Δ⁵-3-ethylenedioxy-11:20-dioxo-pregnene is dissolved in 100 cc. of optically pure cyclohexane, irradiated with ultraviolet light as described in Example 1, and the reaction products are purified by chromatography on a column of 30 grams of alumina. Benzene and 10:1 and 8:1 mixtures of benzene+ether elute from the column a total of 420 mg. of crystalline 18→20-cyclo-Δ⁵-3-ethylenedioxy-20-ξ-hydroxy-11-oxo-pregnene which is characterized by infrared absorption bands at 3540 cm.⁻¹ (hydroxy) and at 1700 cm.⁻¹ (carbonyl C–11).

EXAMPLE 7

1 gram of Δ⁵-3-ethylenedioxy-21-acetoxy-20-keto-pregnene dissolved in 100 cc. of cyclohexane is irradiated with ultraviolet light as described in Example 1 and the reaction products are purified by chromatography on a column consisting of 30 grams of aluminum oxide. With mixtures of benzene and ether 8:1 and 5:1 480 mg. of crystalline Δ⁵-3-ethylenedioxy-20-ξ-hydroxy-21-acetoxy-18,20-cyclo-pregnene are eluted from the column. The product is characterized by infrared absorption bands at 3460 cm.⁻¹ (hydroxyl) and 1730 cm.⁻¹ (acetate C–21).

EXAMPLE 8

1 gram of Δ⁵-3-ethylenedioxy-11β-hydroxy-21-acetoxy-20-keto-pregnene dissolved in 200 cc. of optically pure cyclohexane is irradiated with ultraviolet light, the Δ⁵-3-ethylenedioxy-11β:20-ξ-dihydroxy - 21 - acetoxy - 18:20-cyclo-pregnene formed is isolated by means of chromatography on silica gel (600 mg.), dissolved without any further purification in 20 cc. of pyridine and oxidized with 200 mg. of chromium trioxide at 20° C. After working up, the neutral oxidation product (570 mg.) is dissolved in benzene and the solution is filtered through a column of 18 grams of aluminum oxide (activity III–IV). 375 mg. of crystals are obtained which are identified by means of infrared absorption bands at 3500, 1735 and 1710 cm.⁻¹ as Δ⁵-3-ethylenedioxy-20-ξ-hydroxy-21 - acetoxy-11-keto-18:20-cyclo-pregnene.

EXAMPLE 9

Δ⁵-3-ethylenedioxy-11β-acetoxy-20-keto - pregnene dissolved in cyclohexane is irradiated with ultraviolet light. After working up in the manner described in the preceding examples there is obtained Δ⁵-3-ethylenedioxy-20-ξ-hydroxy-11β-acetoxy-18:20-cyclo-pregnene.

EXAMPLE 10

Δ⁵-3-ethylenedioxy-11α-acetoxy-20-keto - pregnene is isomerized by irradiation with ultraviolet light to form Δ⁵-3-ethylene-dioxy-20-ξ-hydroxy-11α - acetoxy - 18:20-cyclo-pregnene. The latter is hydrolysed with 0.5 N-methylalcoholic potassium hydroxide solution with heating and the Δ⁵-3-ethylenedioxy-11α:20-ξ-dihydroxy-18:20-cyclopregnene formed is cautiously oxidized with chromic acid anhydride in pyridine. There is obtained Δ⁵-3-ethylenedioxy-20-ξ-hydroxy-11-keto-18:20-cyclo - pregnene described in Example 6.

EXAMPLE 11

A solution of 300 mg. of 18:20-cyclo-3β-acetoxy-20-hydroxy-5α-pregnane melting at 139–140° C., $[\alpha]_D = +15°$ (c.=0.77)), in 10 cc. of pyridine is treated with 4.5 grams of phosphorus oxychloride, and the mixture is heated for 2 hours on a water bath. After cooling, the reaction mixture is poured over ice, taken up in ether and washed with sodium carbonate solution and with water. On evaporation the ethereal solution yields 281 mg. of oil. Chromatagrophay on a column of neutral alumina (activity II) with petroleum ether elutes a total of 205 mg. of crystals giving a positive tetranitromethane reaction. After 4 recrystallizations from ether+methanol and sublimation in a high vacuum they melt at 91° C.; $[\alpha]_D = +40°$ (c.=0.79). Infrared absorption spectrum in carbon tetrachloride: bands at 3065, 1731, 1670 and 878 cm.⁻¹. The product is Δ²⁰-18:20-cyclo-3β-acetoxy-5α-pregnene.

574 mg. of Δ²⁰-18:20-cyclo-3β-acetoxy-5α-pregnene are dissolved in 3 cc. of pyridine and while being cooled treated with 426 mg. of osmium tetroxide. The mixture is kept for 3 days in the dark at room temperature, whereupon hydrogen sulfide is introduced for 20 minutes, the solution is freed by filtration from the precipitated osmium sulfide, and the residue is washed with a large amount of pyridine. The dark-brown solution is evaporated in vacuo to dryness, and the residue is purified by chromatography on a column of neutral alumina (activity III). The fractions eluted with ether and 10:1 mixtures of ether and methanol, amounting to 339 mg., yield after having been recrystallized four times from methylene chloride+hexane crystals melting at 177–178° C.; $[\alpha]_D = +4°$ (c.=0.57). Infra-red absorption spectrum in Nujol: bands at 3320, 3210, 1725 and 1238 cm.⁻¹. The product is 18:20-cyclo-3β-acetoxy-20:21-dihydroxy-5α-pregnane which can be hydrolysed to yield 18:20-cyclo-3β:20:21-trihydroxy-5α-pregnane, for example with the aid of a solution of potassium carbonate or sodium carbonate.

28 mg. of 18:20-cyclo-3β-acetoxy-20:21-dihydroxy-5α-pregnane are acetylated overnight at room temperature with a 1:1 mixture of pyridine and acetanhydride. Working up and crystallization from methylene chloride+methanol and methylene chloride+hexane yields 18:20-cyclo-3β:21-diacetoxy-20-hydroxy-5α-pregnane melting at 172–173° C.; $[\alpha]_D = +3°$ (c.=0.37). Infra-red absorption spectrum in Nujol: bands at 3490, 1746, 1720 and 1255 cm.⁻¹.

A solution of 160 mg. of 18:20-cyclo-3β-acetoxy-20:21-dihydroxy-5α-pregnane in 24 cc. of methanol and 6 cc. of pyridine is mixed with a solution of 1 gram of periodic acid in 4 cc. of water. The reaction mixture is kept for 40 minutes at room temperature, taken up in ether, washed with dilute sodium hydroxide solution and with water, and evaporated. The residue (132 mg.) melts after three recrystallizations from methylene chloride+hexane at 150–151° C.; $[\alpha]_D = +8°$ (c.=0.75). Infra-red absorption spectrum in carbon disulfide: bands at 1778, 1735 and 1245 cm.$^{-1}$. The product is 18:20-cyclo-3β-acetoxy-20-oxo-21-nor-5α-pregnane. Its 2:4-dinitrophenyl hydrazone melts at 219–220° C. after having been recrystallized from methylene chloride+hexane.

Recrystallization of 18:20-cyclo-3β-acetoxy-20-oxo-21-nor-5α-pregnane from ethylene chloride+methanol or from aqueous methanol yields 18:20-cyclo-3β-acetoxy-20:20-dimethoxy-21-nor-5α-pregnane melting at 138–139° C.; $[\alpha]_D = +77°$ (c.=0.57). Infra-red absorption spectrum in carbon disulfide: bands at 1735 and 1245 cm.$^{-1}$.

Treatment of the 20:20-dimethoxy derivative with 2:4-dinitrophenyl hydrazine yields the 2:4-dinitrophenyl hydrazone described above, melting at 219–220° C.

Cleavage of 55 mg. of the above 20:20-dimethoxy derivative in 3 cc. glacial acetic acid, 2 cc. of methanol and 1 cc. of water for 2 hours at 60° C. yields 18:20-cyclo-3β-acetoxy-20-oxo-21-nor-5α - pregnane melting at 150–151° C.

Hydrolysis of 18:20-cyclo-3β-acetoxy-20-oxo-21-nor-5α-pregnane with a methanolic potassium hydroxide solution of 5% strength at room temperature yields 18:20-cyclo-3β-hydroxy-20-oxo-21-nor-5α-pregnane melting at 113–114° C. (from acetone+hexane). Infra-red absorption spectrum in carbon disulfide: bands at 3500 and 1776 cm.$^{-1}$.

EXAMPLE 12

A solution of 5.121 grams of $\Delta^5$-3β-acetoxy-20-keto-pregnene in 1 liter of n-hexane is irradiated for 6 hours as described in Example 1. The solvent is then evaporated and the oily residue is chromatographed on 130 grams of neutral alumina of activity II.

residue is chromatographed on neutral alumina of activity II. A 9:1 mixture of petroleum ether and benzene elutes 94 mg. of crystals which have a constant melting point of 145° C. after having been recrystallized three times from ether+hexane. $[\alpha]_D = -36°$ (c.=0.7). Infra-red absorption spectrum in carbon disulfide: bands at 1735 and 1244 cm.$^{-1}$. The product is $\Delta^5$-18:20-cyclo-3β:20-diacetoxy-pregnene.

668 mg. of $\Delta^5$ 18:20 cyclo-3β-acetoxy-20-ξ-hydroxy-pregnene are refluxed for 2 hours in 50 cc. of methanolic potassium hydroxide solution of 5% stregnth. The mixture is then poured into water, extracted with ether, washed with water until neutral, and the solution is evaporated, to yield 584 mg. of crystals melting constantly at 224–225° C. after having been recrystallized four times from methylene chloride+hexane. $[\alpha]_D = -29°$ (c.=0.37). Infra-red absorption spectrum in Nujol: band at 3370 cm.$^{-1}$. The product is $\Delta^5$-18:20-cyclo-3β:20-ξ-dihydroxy-pregnene.

190 mg. of $\Delta^5$-18:20-cyclo-3β-20-ξ-dihydroxy-pregnene are refluxed in 20 cc. of benzene with 4 cc. of acetone and 400 mg. of tertiary aluminum butylate for 16 hours. The reaction solution is diluted with ether, and the ethereal solution is washed with dilute sulfuric acid and with water. The resulting crude product is repeatedly recrystallized from acetone+hexane and has the constant melting point of 191–192° C. $[\alpha]_D = +130°$ (c.=0.77). Infra-red absorption spectrum in chloroform: bands at 3620, 1668 and 1622 cm.$^{-1}$. Ultra-violet absorption spectrum in rectified alcohol: $\lambda_{max}$ at 243 m$\mu$ (log $\epsilon$=4.16). The product is $\Delta^4$-18:20-cyclo-3-oxo-20-hydroxy-pregnene.

A solution of 100 mg. of $\Delta^5$-18:20-cyclo-3β-acetoxy-20-ξ-hydroxy-pregnene in 10 cc. of glacial acetic acid is hydrated in the presence of 100 mg. of platinum dioxide. The catalyst is filtered off the solution, the solvent evaporated and the residue is chromatographed on neutral alumina (activity II). A 1:1 mixture of petroleum ether+benzene, and benzene, elute a total of 62 mg. of

| Fraction | Solvent | cc. | Eluate, mg. | M.P.,+ ° C. | Remarks |
|---|---|---|---|---|---|
| 1–5 | Petroleum ether+benzene 1:1 | 1,000 | 3,119 | | Oil+starting material. |
| 6–8 | Benzene | 600 | 555 | | Oil. |
| 9–12 | Benzene+ether 20:1 | 800 | 1,286 | 142–143 | Crystals. |
| 13–15 | Benzene+ether 1:1 | 600 | 218 | | Oil. |
| 16 | Ether | 200 | 21 | | Oil. |
| 17 | Methanol | 200 | 101 | | Oil. |

+After one crystallization from ether+hexane.

The fractions 1–5 consist predominantly of starting material (3.12 grams). The substance (1.29 grams) eluted with a 20:1 mixture of benzene and ether displays a constant melting point of 145–146° C. after repeated recrystallization from ether+hexane. $[\alpha]_D = -65°$ (c.=0.78. Infra-red absorption spectrum in chloroform: bands at 3600, 1723 and 1256 cm.$^{-1}$. The product is $\Delta^5$-18:20-cyclo-3β-acetoxy-20-ξ-hydroxy-pregnene.

108 mg. of the irradiated product $\Delta^5$-18:20-cyclo-3β-acetoxy-20-ξ-hydroxy-pregnene are kept for 4 days at room temperature in 10 cc. of a 1:1 mixture of acetanhydride and pyridine, then evaporated in vacuo, and the crystals giving a negative tetranitro-methane reaction. After the product has been recrystallized from ether+hexane it has a constant melting point of 137–139° C. $[\alpha]_D = +11°$ (c.=0.51).

The mixed melting point test with the 18:20-cyclo-3β-acetoxy-20-ξ-hydroxy-5α-pregnane used as starting material in Example 1 produces no depression of the melting point.

As described in Example 1, $\Delta^5$-18:20-cyclo-3β-acetoxy-20-hydroxy-pregnene can be dehydrated to yield $\Delta^{5,20}$-18:20-cyclo-3β-acetoxy-pregnadiene. Hydroxylation of the latter compound produces $\Delta^5$-18:20-cyclo-3β-acetoxy- 20:21-dihydroxy-pregnene which can be split with periodic acid to yield $\Delta^5$-18:20-cyclo-3β-acetoxy-20-oxo-21-nor-pregnene.

*Example 13*

The following starting materials can be converted into the appropriate intermediate and final products by the processes described in Examples 1 and 11:

phorus oxychloride and pyridine and in the dehydration product the 20:21-double bond is oxidatively split, e.g., with the aid of osmium tetroxide and periodic acid following the procedure set forth in Example 11 to obtain the $\Delta^4$-18:20-cyclo-3:20-dioxo-21-nor-pregnene. The latter may be oxidised with the aid of monoperphthalic acid to yield the 20:18-lactone of the $\Delta^4$-3-oxo-18-hydroxy-21-

| Starting material | Intermediate and Final Products |
|---|---|
| $\Delta^4$-3-ethylene-dioxy-20-oxo-pregnene. | $\Delta^5$-18:20-cyclo-3-ethylenedioxy-20-hydroxy-pregnene.<br>$\Delta^{5:20}$-18:20-cyclo-3-ethylene-dioxy-pregnadiene.<br>$\Delta^5$-18:20-cyclo-3-ethylenedioxy-20:21-dihydroxy-pregnene.<br>$\Delta^5$-18:20-cyclo-3-ethylenedioxy-20-oxo-21-nor-pregnene.<br>$\Delta^4$-18:20-cyclo-3:20-dioxo-21-nor-pregnene. |
| $\Delta^5$-3-ethylenedioxy-11α-acetoxy-20-oxopregnene. | $\Delta^5$-18:20-cyclo-3-ethylenedioxy-11α-acetoxy-20-hydroxy-pregnene.<br>$\Delta^{5:20}$-18:20-cyclo-3-ethylene-dioxy-11α-acetoxy-pregnadiene.<br>$\Delta^5$-18:20-cyclo-3-ethylenedioxy-11α-acetoxy-20:21-dihydroxy-pregnene.<br>$\Delta^5$-18:20-cyclo-3-ethylenedioxy-11α-acetoxy-20-oxo-21-nor-pregnene.<br>$\Delta^4$-18:20-cyclo-3:20-dioxo-11α-acetoxy-21-nor-pregnene. |
| $\Delta^5$-3-ethylenedioxy-9α-fluoro-11β-hydroxy-20-oxo-pregnene. | $\Delta^5$-18:20-cyclo-3-ethylenedioxy-9α-fluoro-11β,20-dihydroxy-pregnene.<br>$\Delta^{5:20}$-18:20-cyclo-3-ethylene-dioxy-9α-fluoro-11β-hydroxy-pregnadiene.<br>$\Delta^5$-18:20-cyclo-3-ethylenedioxy-9α-fluoro-11β,20,21-trihydroxy-pregnene.<br>$\Delta^5$-18:20-cyclo-3-ethylenedioxy-9α-fluoro-11β-hydroxy-20-oxo-21-nor-pregnene.<br>$\Delta^4$-18:20-cyclo-3,20-dioxo-9α-fluoro-11β-hydroxy-21-nor-pregnene. |
| $\Delta^5$-3β-acetoxy-12α-fluoro-11β-hydroxy-20-oxo-pregnene. | $\Delta^5$-18:20-cyclo-3β-acetoxy-12α-fluoro-11β,20-dihydroxy-pregnene.<br>$\Delta^{5:20}$-18:20-cyclo-3β-acetoxy-12α-fluoro-11β-hydroxy-pregnadiene.<br>$\Delta^5$-18:20-cyclo-3β-acetoxy-12α-fluoro-11β,20,21-trihydroxy-pregnene.<br>$\Delta^5$-18:20-cyclo-3β-acetoxy-12α-fluoro-11β-hydroxy-20-oxo-21-nor-pregnene. |
| 3β,11α-diacetoxy-16α-methyl-20-oxo-5α-pregnane. | 18:20-cyclo-3β,11α-diacetoxy-16α-methyl-20-hydroxy-5α-pregnane.<br>$\Delta^{20}$-18:20-cyclo-3β,11α-diacetoxy-16α-methyl-5α-pregnene.<br>18:20-cyclo-3β,11α-diacetoxy-16α-methyl-20,21-dihydroxy-5α-pregnane.<br>18:20-cyclo-3β,11α-diacetoxy-16α-methyl-20-oxo-21-nor-5α-pregnane. |

*Example 14*

300 mg. of 18:20-cyclo-3β-acetoxy-20-hydroxy-5α-pregnane are dehydrated as described in Example 11. The resulting crude product, which is a mixture of $\Delta^{20}$-18:20-cyclo-3β-acetoxy-5α-pregnene and $\Delta^{18\cdot20}$-18:20-cyclo-3β-acetoxy-5α-pregnene, is hydroxylated with osmium tetroxide as described in Example 11, and the resulting hydroxylated product is treated with periodic acid. The chromatographic separation of the reaction mixture yields, in addition to 18:20-cyclo-3β acetoxy-20-oxo-21-nor-5α-pregnane, 3β-acetoxy-18:20-dioxo - 5α - pregnane melting at 161–166.5° C. $[\alpha]_D = +24°$ (c.=0.67). Oxidation of the latter compound with chromium trioxide in a mixture of glacial acetic acid and sulfuric acid yields 3β-acetoxy-20-oxo-5α-pregnane-18-acid in the form of the 18:20 lactone thereof.

nor-pregnene-20-acid. Ketalization with ethylene glycol and p-toluene-sulfonic acid affords the corresponding 3-ketal which after conversion with methyl magnesium iodide and acidic hydrolysis yields the 18-hydroxy progesterone.

EXAMPLE 16

A solution of 2.0 grams of 3-ethylenedioxy-11-acetoxy-20-oxo-$\Delta^5$-pregnene in 500 ml. of ethanol is irradiated for 6 hours at room temperature, and while passing nitrogen through, with a high pressure quartz burner Type Biosol, Philips 6250 watt (distance separating the burner from the reaction vessel: about 5 to 10 cm.). During the irradiation treatment the solution is vigorously stirred with a magnetic stirrer. The solution is evaporated in a rotary evaporator and the crude product is chromatographed on 60 grams of neutral alumina (activity II).

| Fraction | Solvent | ml. | Eluate, mg. | Melting point,+ °C. | Remarks |
|---|---|---|---|---|---|
| 1–4 | Benzene | 400 | 298 | | Oil. |
| 5–12 | Benzene:ether 9:1<br>Benzene:ether 4:1 | 500<br>300 | 524 | | Oil. |
| 13 | Benzene:ether 1:1 | 100 | 118 | | Oil+crystals. |
| 14–21 | Benzene:ether 1:1<br>Ether | 500<br>300 | 581 | 161 | Crystals. |
| 22–23 | Methanol | 200 | 408 | | Oil. |

+ After one crystallization from acetone+petroleum ether.

EXAMPLE 15

The $\Delta^4$-18:20-cyclo-3-oxo-20-hydroxy-pregnene obtained according to Example 12 is dehydrated with phos- The fractions 14–21 (581 mg.) yield crystalline (20S)-3-ethylenedioxy-11α-acetoxy - 20 - hydroxy - $\Delta^5$ - 18:20-cyclopregnene which, after 4 recrystallizations from acetone-petroleum ether, has a constant melting point of 163° C. Optical rotation $[\alpha]_D = -13°$ (c.=1.27). Infra-red absorption spectrum in chloroform: bands at 3620, 1725 and 1255 cm.$^{-1}$.

250 mg. of the resulting product are hydrolysed for 1 hour at the boil with 10 ml. of methanolic potassium hydroxide solution of 5% strength, whereupon the reaction mixture is taken up in ether, the organic phase is washed with water until the washings run neutral, dried over sodium sulfate and evaporated to dryness in a rotary evaporator, to yield 240 mg. of crystals which, after two recrystallizations from methylene chloride+petroleum ether, display a constant melting point of 207–208° C. Optical rotation $[\alpha]_D = -14°$ (c.=0.805). Infra-red absorption spectrum in chloroform: band at 3620 cm.$^{-1}$. The product is (20S)-3-ethylenedioxy-11α-20-dihydroxy-$\Delta^5$-18:20-cyclopregnene.

A solution of 100 mg. of the last-mentioned ketal in 3 ml. of glacial acetic acid, 2.5 ml. of methanol and 1.5 ml. of water is heated for 1½ hours at 60° C., then taken up in ether; the ethereal phase is washed with water until the washings run neutral, dried over sodium sulfate and evaporated, to yield 80 mg. of crude product which, after two recrystallizations from acetone, melts at 205–206° C. The compound, namely (20S)-3-oxo-11:20-dihydroxy-$\Delta^4$-18:20-cyclopregnene, displays in the infra-red absorption spectrum in chloroform bands at 3260, 1665 and 1617 cm.$^{-1}$ and in the ultra-violet absorption spectrum a $\lambda_{max}$ at 243 m$\mu$, $\epsilon$=15,700 in ethanol. Insofar as its mixed melting point and thin-layer chromatogram are concerned, the product is identical with the product obtained by microbiological hydroxylation as described in Example 17.

EXAMPLE 17

4 liters of a nutrient solution, which contains per liter of tap water 2.6 grams of tartaric acid, 2.6 grams of ammonium tartrate, 0.17 gram of ammonium sulfate. 0.4 gram of secondary ammonium phosphate, 0.4 gram of potassium carbonate, 0.27 gram of magnesium carbonate, 50 grams of glucose and 1 gram of Difco yeast extract and has been adjusted to pH=5, are sterilized in a shaking vessel and inoculated with a culture, grown for 2 days in a conical flask, of *Aspergillus ochraceus*. While passing air through the culture, the fungus is allowed to grow further for 33 hours at 26 to 28° C., whereupon a solution of 1.2 grams of (20S)-3-oxo-20-hydroxy-$\Delta^4$-18:20-cyclopregnene in 35 ml. of ethanol is added. After 22 hours' incubation under identical conditions, the mycelium is suctioned off and thoroughly washed with 3 portions of 3, 2 and 1 liter of ethyl acetate. The washings are used to extract the culture filtrate saturated with sodium chloride. The ethyl acetate extracts are washed with 1.5 liters of sodium chloride solution of 10% strength, dried with anhydrous sodium sulfate, and evaporated under vacuum. The residue (1.5 grams) is chromatographed on 20 grams of inactivated silica gel (containing 15% by weight of water). Elution is performed first with methylene chloride to yield fractions which, after having been crystallized from acetone+ ether, yield 322 mg. of the parent steroid melting at 194.5 to 196° C. Methylene chloride+acetone mixtures 17:1, 9:1 and 4:1 then yield a total of 789 mg. of substantially unitary (20S)-3-oxo-11:20-dihydroxy-$\Delta^4$-18:20-cyclopregnene which, after recrystallization from acetone, has a constant melting point of 205–206° C. Optical rotation $[\alpha]_D^{27} = +113 \pm 2°$ (c.=0.554 in dioxane). Infra-red absorption spectrum in Nujol: bands at 3413, 1657 and 1608 cm.$^{-1}$. Ultraviolet absorption spectrum in ethanol: $\lambda_{max}$ at 243 m$\mu$ ($\epsilon$=15,700). Paper-chromatographic examination reveals the product to be unitary; it has the following $R_f$-values: Bush Bl$_1$ (38°) 0.35; Bush C (38°) 0.63; formamide/benzene-chloroform (1:1) (22°) 0.44; formamide-chloroform (22°) 0.73; formamide/butyl acetate-water (100:5) (22°) 0.67; formamide/chloroform - dioxanebutanol (7:2:1) (22°) 0.85.

EXAMPLE 18

4 liters of a nutrient solution, which contains per liter of tap water 10 grams of cane sugar, 10 grams of Difco Trypton, 2 grams of sodium nitrite, 1 gram of secondary potassium phosphate, 0.5 gram of magnesium sulfate heptahydrate, 0.5 gram of patassium chloride and 10 mg. of ferrous sulfate heptahydrate and has been adjusted to pH=7, are mixed with 10 grams of calcium carbonate (in solid form), sterilized in a shaking vessel and inoculated with a culture, grown for 1½ days in a conical flask, of *Curvularia lunata* (Wakker) Boedijn (NRRL 2380). While passing air through the culture, the fungus is allowed to grow for another 2 days, whereupon a solution of 1.5 grams of (20S)-3-oxo-20-hydroxy-$\Delta^4$-18:20-cyclopregnene in 45 ml. of acetone is added. After 2 days' incubation the culture is extracted as described in Example 17. By column-chromatographic purification of the crude reaction product on 30 times its own weight of inactivated silica gel (containing 15% by weight of water), elution with methylene chloride+ acetone (9:1) yields 684 mg. of paper-chromatographically unitary (20S)-3-oxo-11$\beta$:20-dihydroxy-$\Delta^4$-18:20-cyclopregnene which is recrystallized from acetone+ether or from acetone+petroleum ether. Ultra-violet absorption spectrum in ethanol: $\lambda_{max}$ at 242 m$\mu$, $\epsilon$=16,000.

EXAMPLE 19

A solution of 2.10 grams of 3$\beta$:11$\beta$-diacetoxy-20-oxo-5$\alpha$-pregnane in 1.250 liters of ethanol is irradiated for 4 hours as described in Example 16. The solution is then evaporated in a rotary evaporator and chromatographed on 60 grams of neutral alumina (activity II). The following fractions are thus obtained:

| Fraction | Solvent | Eluate | | Meltg. point, °C.+ | Remarks |
|---|---|---|---|---|---|
| | | Ml. | Mg. | | |
| 1–3 | Petroleum ether+benzene 3:1 | 300 | 83 | | Oil. |
| 4–5 | {Petroleum ether+benzene 3:1 / Petroleum ether+benzene 2:1} | 100 / 100 | 159 | 115–116 | Crystals. |
| 6–8 | {Petroleum ether+benzene 2:1 / Petroleum ether+benzene 1:1} | 200 / 100 | 142 | | Oils. |
| 9–10 | {Petroleum ether—benzene 1:1 / Benzene} | 100 / 100 | 234 | 102–103 | Crystals. |
| 11 | Benzene | 100 | 83 | | Oil. |
| 12 | do | 100 | 67 | 183 | Crystals. |
| 13–17 | {Benzene / Benzene-ether 9:1 / Ether} | 100 / 300 / 100 | 445 | | Oil. |
| 18–20 | Ether | 300 | 368 | 173 | Crystals. |
| 21–22 | {Ether / Methanol} | 100 / 200 | 161 | | Oil. |

+ After crystallization from ether+petroleum ether.

From fractions 18–20 (368 mg.) crystalline (20S)-3β: 11β-diacetoxy-20 - hydroxy-18:20-cyclo-5α-pregnane precipitates; after four recrystallizations from ether+petroleum ether it has a constant melting point of 173° C. Optical rotation $[\alpha]_D= +40°$ (c.=0.898). Infra-red absorption spectrum in chloroform: bands at 3620, 1725 and 1260 cm.$^{-1}$.

From fraction 12 (67 mg.) a compound can be isolated which is isomeric in position 20 to the compound mentioned above and melts at 183° C. Its infra-red spectrum in chloroform contains bands at 3620, 1725 and 1255 cm.$^{-1}$.

Fractions 4 to 5 and 9 to 10 yield further by-products not being 18:20-cyclosteroids.

A solution of 128 mg. of the above (20S)-3β:11β-diacetoxy-20-hydroxy-18:20-cyclo-5α-pregnane in 20 ml. of absolute ether is mixed with 130 mg. of lithium aluminum hydride and the whole is refluxed for 2 hours and then allowed to cool. The excess of reducing agent is decomposed by dropping in ethyl acetate while cooling with ice, and the mixture is acidified with dilute sulfuric acid. The crude product is worked up in usual manner, crystallized from petroleum ether+ether (melting point 226–228° C.) and for analysis sublimed in a high vacuum at 165° C., whereupon it melts at 231.5–232° C. Optical rotation $[\alpha]_D= +12°$ (c.=0.803 in pyridine). Infra-red absorption spectrum in Nujol: bands at 3480 and 3300 cm.$^{-1}$.

60 mg. of the triol obtained in this manner are dissolved in 1.5 ml. each of acetic anhydride and pyridine and kept overnight at room temperature. The solution is then taken up in ether, and the organic phase is successively washed with dilute sulfuric acid and with saturated sodium bicarbonate solution and worked up in usual manner. The resulting crude product is chromatographed on neutral alumina (activity II). With a 1:1-mixture of petroleum ether and benzene, and with benzene, crystals can be isolated in quantitative yield, which, after three crystallizations from ether+hexane, melt constant at 187.5–188° C. The crystals are (20S)-3β-acetoxy-11β-20-dihydroxy-18:20-cyclo-5α-pregnane. Optical rotation $[\alpha]_D= +31°$ (c.=1.43). Infra-red spectrum in chloroform: bands at 3620, 1727 and 1265 cm.$^{-1}$.

When the hydrolysis of the above-described (20S)-3β: 11β-diacetoxy-20-hydroxy-18:20-cyclo-5α-pregnane is not performed with lithium aluminum hydride, but by mild saponification with an aqueous alkali, there is obtained (20S)-3β-hydroxy-11β-acetoxy - 18:20-cyclo-5α-pregnane. In this compound it is possible to dehydrogenate the 3-hydroxyl group to the oxo group, for example according to Oppenauer, and to introduce a double bond in position 4:5 by the method described in the introduction, whereby the 11-acetate of the (20S)-Δ⁴-3-oxo-11β:20-dihydroxy-18:20-cyclopregnene described in Example 18 is obtained and, by hydrolysis under usual conditions, the corresponding free 11β-hydroxy compound.

What is claimed is:

1. Process for the manufacture of 17:20-cyclo-20-hydroxy pregnane compounds wherein an 18-unsubstituted 20-oxo-pregnane compound is irradiated in a solvent selected from the group consisting of a hydrocarbon, an alcohol, an ether, a carboxylic acid, a mixture of these solvents with water and a mixture of a carboxylic acid and sulfuric acid by ultraviolet light, and the resulting 18,20-cyclo-20-hydroxy-pregnane compound is isolated from the reaction mixture.

2. Process according to claim 1, wherein a mixture of glacial acetic acid and sulfuric acid is used as solvent.

3. A compound selected from the group consisting of Δ⁴-3-oxo-11:20:21-trihydroxy-18:20-cyclo-pregnene, the 21 acetate thereof and 3-ethylene ketal thereof.

4. 18:20-cyclo-3β:20:21-trihydroxy-5α-pregnane.

5. Δ⁵-18:20-cyclo-3β:20:21-trihydroxy-pregnene.

6. Δ⁴-18:20-cyclo-3-oxo-20:21-dihydroxy-pregnene.

7. Δ⁴-18:20-cyclo-3-oxo-11α:20:21 - trihydroxy - pregnene.

8. Δ⁴-3-oxo-11β,20-dihydroxy - 18,20 - cyclo - pregnene

9. Δ²⁰-18:20-cyclo-3β-hydroxy-5α-pregnene.

10. Δ⁴·²⁰-18:20-cyclo-3β-hydroxy-pregnadiene.

11. Δ⁴·²⁰-18:20-cyclo-3-oxo-pregnadiene.

12. Δ⁴·²⁰-18:20-cyclo-3-oxo-11α-hydroxy-pregnadiene.

13. A member selected from the group consisting of a compound of the formula

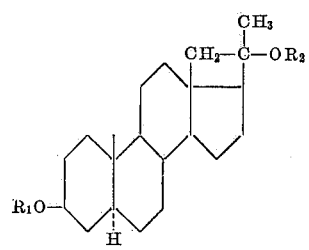

in which $R_1$ and $R_2$ represent a member selected from the group consisting of hydrogen and acetyl and the 5-dehydro derivatives thereof.

14. A member selected from the group consisting of a compound of the formula

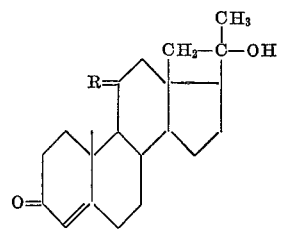

in which R represents a member selected from the group consisting of

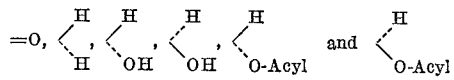

and the Δ⁵-3-lower alkylene ketals thereof said acyl being derived from a member selected from the group consisting a corboxylic and a sulfonic acid having 1 to 12 carbon atoms.

15. A member selected from the group consisting of a compound having the formula

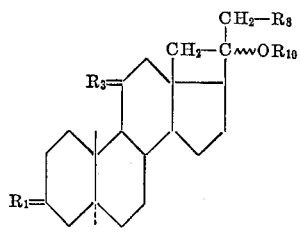

in which $R_1$ is a member selected from the group consisting of oxo, lower alkylenedioxy and $R_6O$ together with hydrogen, $R_3$ is a member selected from the group consisting of hydrogen, oxo and $R_7O$ together with hydrogen, $R_8$ is a member selected from the group consisting of hydrogen and $R_9O$ and $R_6$, $R_7$, $R_9$ and $R_{10}$ each is a member selected from the group consisting of hydrogen and the acyl radical of a carboxylic acid having from 1 to 12 carbon atoms, the corresponding Δ⁴-3-oxo-compounds, Δ⁵-3-lower alkylenedioxy-compounds and the Δ⁵-3-$R_6O$-compounds.

16. A member selected from the group consisting of a compound having the formula

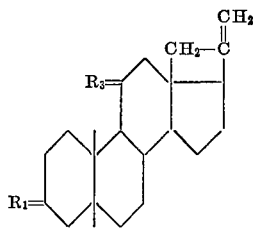

in which $R_1$ is a member selected from the group consisting of oxo, lower alkylenedioxy and $R_6O$ together with hydrogen, $R_3$ is a member selected from the group consisting of hydrogen, oxo and $R_7O$ together with hydrogen, and $R_6$ and $R_7$ each is a member selected from the group consisting of hydrogen and the acyl radical of a carboxylic acid having from 1 to 12 carbon atoms, the corresponding $\Delta^4$-3-oxo-compounds, $\Delta^5$-3-lower alkylenedioxy-compounds and the $\Delta^5$-3-$R_6O$-compounds.

17. A member selected from the group consisting of a compound having the formula

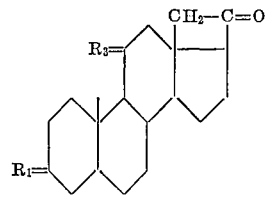

in which $R_1$ is a member selected from the group consisting of oxo, lower alkylenedioxy and $R_6O$ together with hydrogen, $R_3$ is a member selected from the group consisting of hydrogen, oxo and $R_7O$ together with hydrogen, and $R_6$ and $R_7$ each is a member selected from the group consisting of hydrogen and the acyl radical of a carboxylic acid having from 1 to 12 carbon atoms, the corresponding $\Delta^4$-3-oxo-compounds, $\Delta^5$-3-lower alkylenedioxy-compounds and the $\Delta^5$-3-$R_6O$-compounds.

References Cited by the Examiner
UNITED STATES PATENTS 3,014,029  12/61  Jeger _____ 260—239.55

LEWIS GOTTS, *Primary Examiner.*

IRVING MARCUS, *Examiner.*

UNITED STATES PATENT OFFICE
CERTIFICATE OF CORRECTION

Patent No. 3,211,759

October 12, 1965

Oskar Jeger

It is hereby certified that error appears in the above numbered patent requiring correction and that the said Letters Patent should read as corrected below.

Column 17, line 59, for "17:20-" read -- 18:20- --; line 72, for "21 acetate" read -- 21-acetate --; column 18, line 50, for "a corboxylic" read -- of a carboxylic --.

Signed and sealed this 14th day of June 1966.

(SEAL)
Attest:

ERNEST W. SWIDER
Attesting Officer

EDWARD J. BRENNER
Commissioner of Patents